United States Patent
Sharpe et al.

(10) Patent No.: US 7,920,693 B2
(45) Date of Patent: Apr. 5, 2011

(54) HOME AGENT ACCESS IN CALL ROUTING MANAGEMENT BASED ON CALLER LANGUAGE

(75) Inventors: Bruce Sharpe, Aurora, CO (US);
Thomas MacDonald, Parker, CO (US);
Jamie Horgan, Highlands Ranch, CO (US)

(73) Assignee: Teletech Holdings, Inc., Englewood, CO (US)

( * ) Notice: Subject to any disclaimer, the term of this patent is extended or adjusted under 35 U.S.C. 154(b) by 1170 days.

(21) Appl. No.: 11/562,210

(22) Filed: Nov. 21, 2006

(65) Prior Publication Data

US 2007/0160188 A1 Jul. 12, 2007

Related U.S. Application Data

(60) Provisional application No. 60/739,610, filed on Nov. 25, 2005.

(51) Int. Cl.
*H04M 3/00* (2006.01)
*H04M 5/00* (2006.01)
*H04M 3/42* (2006.01)

(52) U.S. Cl. ......... 379/266.09; 379/207.15; 379/265.05; 379/265.12

(58) Field of Classification Search ............. 379/266.09, 379/265.12, 218.01, 207.15, 265.05, 265.11; 709/231
See application file for complete search history.

(56) References Cited

U.S. PATENT DOCUMENTS

| | | | |
|---|---|---|---|
| 6,845,154 B1 | 1/2005 | Cave et al. | |
| 6,934,379 B2 | 8/2005 | Falcon et al. | |
| 7,088,814 B1 * | 8/2006 | Shaffer et al. | 379/265.12 |
| 2003/0115353 A1 * | 6/2003 | Deryugin et al. | 709/231 |
| 2004/0111310 A1 * | 6/2004 | Szlam et al. | 705/8 |
| 2004/0240635 A1 | 12/2004 | Bushey et al. | |
| 2009/0110178 A1 * | 4/2009 | Timmins et al. | 379/218.01 |

OTHER PUBLICATIONS

U.S. Appl. No. 11/317,420, filed Dec. 22, 2005, Non-Final Office Action dated Sep. 16, 2009, Karen L. Le, 10 pages.
U.S. Appl. No. 11/317,420, filed Dec. 22, 2005, Final Office Action dated Aug. 3, 2010, Karen L. Le, 11 pages.

* cited by examiner

*Primary Examiner* — Thjuan K Addy
(74) *Attorney, Agent, or Firm* — Stanley J Gradisar Attorney At Law LLC; Stanley J. Gradisar (57) ABSTRACT

Call center management with at home agent access based on caller language is provided herein. Calls from customers of a client are received at an interactive voice recognition (IVR) system, which determines a language of the caller by detecting the language or language selection by keypad entry. The IVR system determines an available at home agent with the proper language skills and forwards the call to be processed by the at home agent. The at home agents can call the call center to set their status. Information associated with the call may be collected and used by associated system(s) such as quality control, status monitoring, financial processing, and the like.

20 Claims, 9 Drawing Sheets

HOME AGENT ACCESS IN CALL ROUTING MANAGEMENT BASED ON CALLER LANGUAGE

CROSS-REFERENCE TO RELATED APPLICATIONS

This application claims priority to U.S. Provisional Application No. 60/739,610, filed Nov. 25, 2005, entitled "Home Agent Access in Call Routing Management Based on Caller Language," which is hereby incorporated by reference in its entirety as if set forth herein in full.

BACKGROUND

Many call centers handle a large volume of inquiries, usually by phone, for sales, information, customer support and other services. Typical call centers provide the ability to route multiple incoming, customer-initiated calls to agents which provide sales, information, or support on behalf of an entity interested in establishing or maintaining a relationship with the customer. An Automatic Call Distributor (ACD) is utilized to selectively route the incoming calls. An ACD generally refers to a device that receives incoming voice calls, answers with a taped announcement, holds the calls with background music or a message, then automatically assigns the call on a first come first serve basis to the next available agent.

Modern call center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill level or a schedule of the agent. The number of agents within the contact center and available to the system may often be limited by the physical space available for the agents to operate. Contact centers have to deal with a limited number of agents to handle a large number of incoming customer calls.

Furthermore, many call centers provide services to multiple countries, if not worldwide. This may result in a need for call centers to be able to provide their services in multiple languages with consistency. Even in the US, it has become common practice for call centers to provide assistance in at least three or four languages (e.g. Spanish, Chinese, Korean) in addition to English. Establishing separate call centers for each language or directing calls from a single center to different language-based centers may prove challenging for entities that provide services such as sales, support, and the like.

Some at home agents may not have either a computer or high speed internet access. They are only guaranteed to have a telephone. This means that the traditional high speed internet, PC, VPN & IP phone approaches cannot support these interpreters.

It is with respect to these and other considerations that the present invention has been made.

SUMMARY

Embodiments are generally related to over the phone interpretation call management with at home agent access based on caller language. More particularly, the embodiments involve detecting a language preferred by a customer at a call center that manages calls on behalf of a plurality of clients. The detected language selection may be forwarded to a call management center employing a call destination identifier such as a Dialed Number Identification Service (DNIS) number. Information associated with an identity of the client, a project assigned to the client, a subdivision of the client, and the like, may be overloaded to a call origination identifier such as an Automated Number Identification (ANI) number and forwarded to the call management center.

The call management center may assign an agent to service the call based on the language selection, among other aspects. A component of the call center, such as an interactive voice recognition (IVR) system, may determine an available at home agent with the proper language skills and forward the call to be processed by the at home agent. The at home agents can call the call center to report their status. Information associated with the call may be collected and used by associated system(s) such as quality control, status monitoring, financial processing, and the like, according to some embodiments.

Various embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

Embodiments will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In modern electronic telecommunications, incoming calls are no longer necessarily phone communications but can also encompass a broad range of new communication channels such as electronic mail, interactive chat, instant messaging, video conferencing, voice messaging, and the like. The term "call" is used to throughout this text to designate the entire range of communication formats which a call center is capable of handling.

The term "client" refers to entities interested in establishing or maintaining a relationship with the customer, on whose behalf the call center processes incoming calls.

The term "agent" refers to call center personnel or a computerized application, in some cases, that respond to customer calls. "Agents" may be locally situated at the call center or remotely situated. Remotely situated agents may be referred to as "at home agents" or "remote agents".

Figure 1:
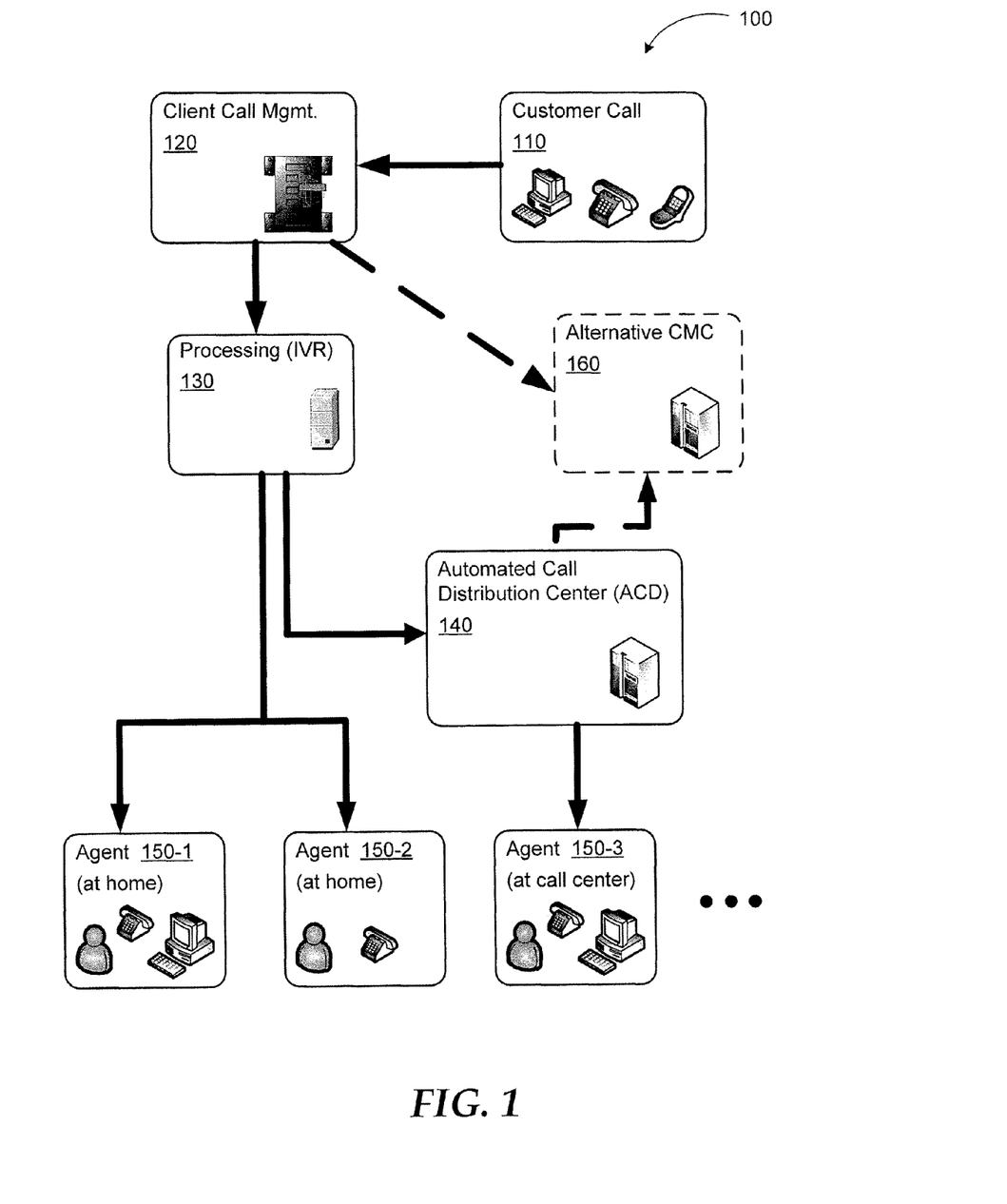
FIG. 1 is a conceptual diagram illustrating major blocks of a call routing management system with at home agent access based on caller language in accordance with an embodiment.

In general, the embodiments relate to processing calls at a call center providing multiple language service directing calls to at home agents based on caller language preference. Referring to FIG. 1, major functional blocks of an example over the phone interpretation (OPI) call management system (100) are shown in a conceptual diagram.

OPI call management system 100 includes customer call 110, client call management block 120, processing block 130, Automated Call Distribution center (ACD) 140, alternative CMC 160, and agents 150-1 through 150-3. Agents 150-1 through 150-3 may include any number of agents servicing calls from customers for sales, customer support, and the like. To display the diversity of agents, Agents 150-1 and 150-2 are designated as at home agents, while agent 150-3 is designated as a call center agent. Each of the major functional blocks may perform a variety of actions associated with managing customer calls. The actions may be performed by one or more computing devices individually, or in a distributed manner where the computing devices communicate over one or more networks. Other devices such as telephones, telephone network devices, and the like may also be part of the OPI call management system. All these devices are well known in the art and need not be discussed at length here.

Computing device(s) performing the actions may contain communications connection(s) for communicating with each other and other devices. The communications connection(s) is/are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

The computing devices typically include at least some form of computer readable media. Computer readable media can be any available media that can be accessed by a processing unit. By way of example, and not limitation, computer readable media may comprise computer storage media and communication media. Combinations of any of the above should also be included within the scope of computer readable media.

As mentioned above, the computing devices may operate in a networked environment using logical connections to one or more remote computers (not shown). The remote computer may be a personal computer, a server computer system, a router, a network PC, a peer device or other common network node, and typically includes many or all of the elements relative to the computer devices. The logical connections between the computer devices may include a local area network (LAN) or a wide area network (WAN), but may also include other networks. Such networking environments are commonplace in offices, enterprise-wide computer networks, intranets, and the Internet.

By way of example, and not limitation, a remote application program may reside on a memory device connected to the remote computer system. It will be appreciated that the network connections explained are exemplary and other means of establishing a communications link between the computers may be used.

With the above described computing environment in mind, logical operations of the various exemplary embodiments described below in connection with an OPI call management process may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

OPI call management system 100 is based on a typical structure of a call center handling calls from customers of multiple clients. For example, a call center may handle customer service calls for a number of retail sales companies, sales calls for catalog sales companies, and patient follow-up calls for health care providers. In such a structure, the call center may receive calls directly from the customers or through client call management systems. Customer call 110 may be placed through client call management block 120 or directly (not shown) to processing block 130 employing methods including a phone call over a PSTN line, a cellular call, an Unlicensed Mobile Access (UMA) network call, an Internet telephony call, computer communications (e.g. electronic mail, instant messaging), and the like. Other methods of communication may also be used implementing the principles described herein.

As a first step in call management, information associated with the customer call may be resolved from the network by client call management block 120 or by processing block 130. Caller information resolved from the voice or data network may include the caller's telephone number or their IP address, whether they are calling from a business or residential line, geographic location, and the like. Further information associated with the caller such as past caller history, caller demographics, and the like may also be retrieved from a database based on the initial caller information. A basic form of caller information is Automatic Number Identification (ANI) number. In typical PSTN systems, the ANI number is the caller's phone number provided to the call destination during the rings before the call is accepted. Other forms of call origination identifiers include IP addresses, International Mobile Subscriber Identity (IMSI) numbers, and the like.

In some embodiments, client call management block 120 may identify a nature of the customer call, a language to be used in handling the call and contact processing block 130 making a language selection. In other embodiments, client call management block 120 may simply forward the call to processing block 130.

Processing block 130 may receive the call along with a language selection (e.g. DTMF keypad entry) or without a language selection. In the latter case, processing block 130 may determine the caller's language employing Interactive Voice Recognition (IVR). Processing block 130 may then modify the ANI number to include information associated with client identification, client project identification, and the like. Processing block 130 subsequently forwards the call to Automated Call Distribution center (ACD) 140 for distribution to an agent. In forwarding the call to ACD 140, processing block 130 may use one of a block of destination addresses (e.g. an 800 number among a block of 800 numbers). If client call management block 120 determines that the caller's language is not among the languages provided by ACD 140, it may forward the call to alternative Call Management Center (CMC) 160.

ACD 140 receives along with the call, information such as selected language, client identification, customer identification, and the like. Parts of that information may be provided in the modified ANI number. Another portion of the information may be provided by the destination address used by processing block 130. For example, Dialed Number Identification Service (DNIS) is a telephone service that identifies for the receiver what telephone number was dialed by the caller. A common use for this type of system is 800 and 900 phone numbers that often channel multiple phone numbers into the same PBX system. Once the call enters the PBX system, the DNIS identifies which number was dialed and records that information. Accordingly, the DNIS number may provide ACD 140 the language selection information.

ACD 140 determines which agent the call should be assigned to based on the language selection, a service schedule, a client and/or project identification, and the like. The call is then connected to the assigned agent. Assigned agents may be at home agents (e.g. agents 150-1, 150-2) or call center agents (e.g. 150-3).

The agent may communicate with the customer through a telephone line or using another method such as e-mail or Internet chat. The agent may consult with a computer application during the call and record the transactions through the same or another application on a computer terminal or a personal computer networked with the call center's recording system. Typically, at home agents may service the customer calls through a PSTN connection without many of the complexities involved with a call center agent, though. Communication between the agent and ACD 140 may be through networks such local area networks (LANs), wide area networks (WANs), the Internet, private wireless or wired networks, or combinations of these networks. At home agents may be located physically at numerous locations throughout the globe. It is not uncommon for a U.S. call center to route customer calls to agents in other countries such as India, Mexico, Argentina, and the like.

ACD 140 may perform many other tasks in addition to routing customer calls to agents. For example, the number of calls handled by each agent for the call center may be tracked and provided to payroll services. Statistical records of each customer-initiated call may be maintained and provided to the client. Moreover, agents' interactions with the customers may be monitored for quality assurance purposes on behalf of the client. ACD 140 may also forward the call to alternative CMC 160, if the language is not provided by its agents, if service capacity is reached, and similar reasons.

Figure 2:
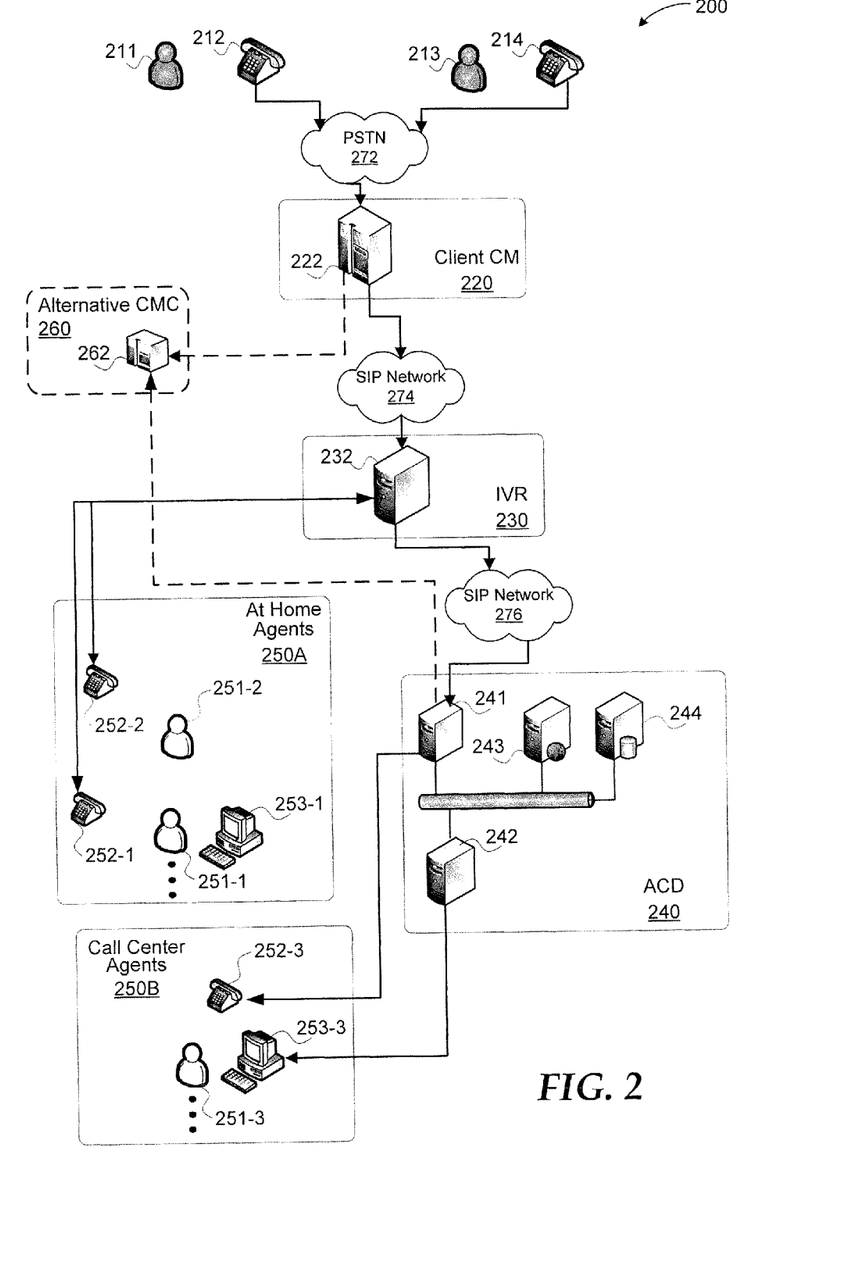
FIG. 2 shows an example embodiment of the call routing management system of FIG. 1 and interactions of its components.
Figure 3:
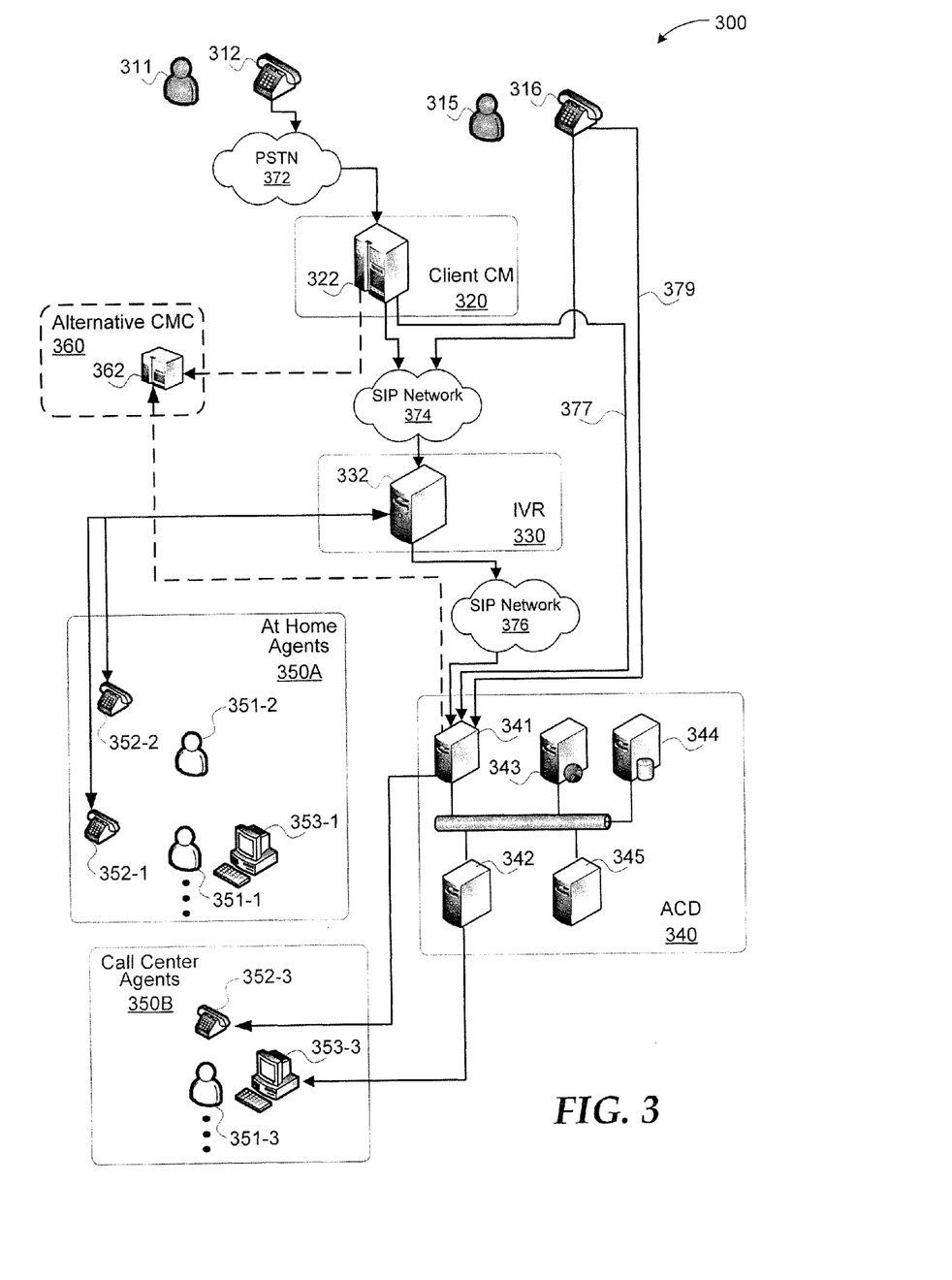
FIG. 3 shows another example embodiment of the call routing management system of FIG. 1 and interactions of its components.

As mentioned previously, many types of communications may be utilized between the customer and the call center. FIGS. 2 and 3 show variations of an OPI call management system receiving customer calls over a PSTN line and using digital SIP networks for communications between the system components.

Referring now to FIG. 2, an example embodiment of an over the phone interpretation (OPI) call management system and interactions of its components are shown. OPI call management system 200 includes customers 211 and 213 placing calls to a call center using phones 212 and 214 over PSTN 272. Client call management system 220 received the customer calls and communicates with Interactive Voice Recognition (IVR) subsystem 230 of a call center over SIP network 274. Client call management system 220 may also forward customer calls to optional alternative call management center 260 in case the call center is incapable handling the call(s) for reasons like language of the caller not being in the call center list, the call center reaching its capacity, call arriving outside a service schedule of the call center, and the like. Calls may be forwarded to the optional alternative call management center 260 by Automated Call Distribution (ACD) center 240 as well, for similar reasons.

Client call management system 220 may comprise one or more servers 222 or other telecommunication equipment known in the art such as switches, converters, and the like. Alternative call management center 260 may include one or more servers (e.g. server 262) to process incoming calls and route them to available agents in a similar manner to ACD center 240.

IVR subsystem 230 may also include one or more servers and other computing devices configured to detect a language of the calling customer and provide feedback in form of voice prompts. IVR server 232 of the IVR subsystem 230 may also detect the preferred language of the customer based on DTMF keypad entries (customer selection). In yet another embodiment, client call management system 220 may provide language selection information to IVR server 232. In addition to detecting the language of the customer, IVR server 232 (or an IVR application thereon) may also detect an accent of the customer such as a difference between Spanish from Mexico and Spanish from Spain. Such an accent detection feature may be utilized in directing calls to agents for different geographic areas. IVR server 232 may further detect a call origination identifier such as an ANI number. The ANI number may be used, in some embodiments, to retrieve customer or client specific information such as geographic information, demographic information, call history, and the like. The ANI number may also be used to determine a client identity and a project or a subdivision associated with the client.

Upon detecting the preferred language and/or accent and retrieving the information associated with the customer and/or client, IVR server 232 may overload the ANI number such that the prefix of the number identifies the project or subdivision associated with the client and the last four digits identify the client. By overloading the ANI number in this manner, IVR server 232 may use any carrier's telecommunication network without having to create special data packets for the forwarded information.

IVR server 232 then forwards the call to a language specific number at ACD center 240. The language specific number (DNIS) identifies the selected language to ACD center 240. Server 241 of ACD center 240 may assign an agent among agents 250B (e.g. agent 251-3) to the call and facilitate connection between the agent's communication equipment (e.g. phone 252-3) and the customer's phone.

According to some embodiments, IVR server 232 may also assign an at home agent among agents 250A (e.g. agents 251-1 and 251-2) and forward the customer call directly to the agent phones 252-1 and 252-2. Call routing systems according to such embodiments may be architected to support an at home agent with just a phone (PSTN, Internet telephony, cellular phone, and the like). Some of the capabilities provided to support access for such agents may include:

- Providing a voice user interface for the interpreters to set his/her dialing specifics
- Providing a secure interface with an interpreter ID and password
- Providing the ability to dial the contact center from any location for the interpreter
- Providing a no-charge call ability to the interpreter
- Providing the ability to change his/her password and DID number to the interpreter
- Providing the ability to activate/deactivate OPI calls to his/her DID number (login/logout) to the interpreter.

In embodiment, where ACD center 240 establishes the connection between the customer and the assigned agent, server 241 may provide the client and customer specific information to an applications server 242 such that an application is executed providing the assigned agent a user interface with customer and client specific information. For example, a customer calling the technical support hotline of a retail company and speaking Chinese may be routed to a Chinese speaking agent by server 241, while applications server 242 brings up a screen on the assigned agent's terminal with information about the customer, the customer's service history, location, purchase history, and the like.

ACD center 240 may include additional servers performing other duties. For example, global workflow server 243 may receive data from server 241 about assigned agents, number and duration of calls, frequency of calls for particular client projects or subdivisions, and the like. Global workflow server 243 may then utilize the data in analyzing, reporting, and managing workflow for particular clients or the call center in general.

In another embodiment, database server 244 may be used to store statistical and other data associated with distributed calls for purposes such as client billing, agent compensation, scheduling, and the like. Servers 241-244 of ACD center 240 may communicate over a network such as the Ethernet network shown in the figure. Other networks providing communication between the servers of ACD center 240 may include any type of network such as dedicated networks, secure/unsecure networks, and the Internet.

In a further embodiment, server 241 or IVR server 232 may assign agents based on a schedule of available services. For example, agent services for different languages may be provided at different times of day, different days of week, and the like. The availability of services may also be based on geographic location, client project, and the like. Server 241 and IVR server 232 may maintain or receive from another server a matrix of available services schedule and assign agents based on the availability of services.

Each of the above listed sub-systems may perform actions explained in FIG. 2 individually or in a shared manner. Some or all of the sub-systems may be combined or split into smaller sub-systems. At least a portion of the actions associated with the OPI call management system may be performed by software applications in each sub-system, while another portion of the actions may be performed by hardware applications. The present invention is not limited to the example software and hardware applications described herein. Furthermore, the network types such as PSTN 272 and SIP network 274 are for example purposes only and do not constitute a limitation on embodiments. Other network types such as wired or wireless networks for Internet telephony, cellular networks, Unlicensed Mobile Access (UMA) networks, and the like may be implemented without departing from a scope and spirit of the invention.

The computing devices described herein are only examples of a suitable operating environment and are not intended to suggest any limitation as to the scope of use or functionality of the embodiments. Other well known computing systems, environments, and/or configurations that may be suitable for use with the embodiments include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 3 illustrates another example embodiment of an OPI call management system and interactions of its components. Components of OPI call management system 300 that are likewise numbered in OPI call management system 200 of FIG. 2 are arranged to operate in a similar manner.

OPI system 300 includes client call management system 320 with its call management server 322 receiving calls from customer 311 using his/her phone 312 over PSTN 372. Client call management system 320 forwards calls to IVR server 332 of IVR subsystem 330 over SIP network 374 or through another network to optional alternative CMC 360. IVR server 332 detects language of the caller, overloads an ANI number with client information and forwards the call to a language specific number (DNIS) at ACD center 340.

ACD center 340 includes, in addition to server 341, applications server 342, global workflow server 343, and database server 344. Server 341 can assign calls to agent 351-3 using their communication equipment 352-3. Applications server 342 provides customer and/or client specific information to the terminals or computers (e.g. 253-3) of assigned agents.

As in OPI system 200, IVR server 332 of OPI system 300 may also directly assign and forward an agent among at home agents 350A (e.g. agents 351-1 and 351-2) to the call and facilitate connection between the agent's communication equipment (e.g. phones 352-1 and 352-2) and the customer's phone.

Differently from OPI call management system 200 of FIG. 2, in OPI call management system 300, customer 315 may place a call directly to ACD center 340. In addition, client call management system 320 may also forward a customer call directly to ACD center 340. In both cases, the language selection is made by DTMF entry or similar method not involving language detection by voice recognition because server 341 of ACD center 340 lacks IVR capability. Furthermore, customer 315 may be enabled to dial into IVR subsystem 330 directly using his/her communication equipment 316. This may require in some cases an Internet telephony or a UMA call, especially if the IVR server 332 is connected to a data packet based network.

Moreover, ACD center 340 may include Computer Telephony Integration (CTI) server 345 arranged to facilitate integrated operation of applications server 342 and server 341. Similar to FIG. 2, servers of ACD center 340 may interact with each other over any type of network such as the Ethernet connection shown in the figure.

Figure 4:
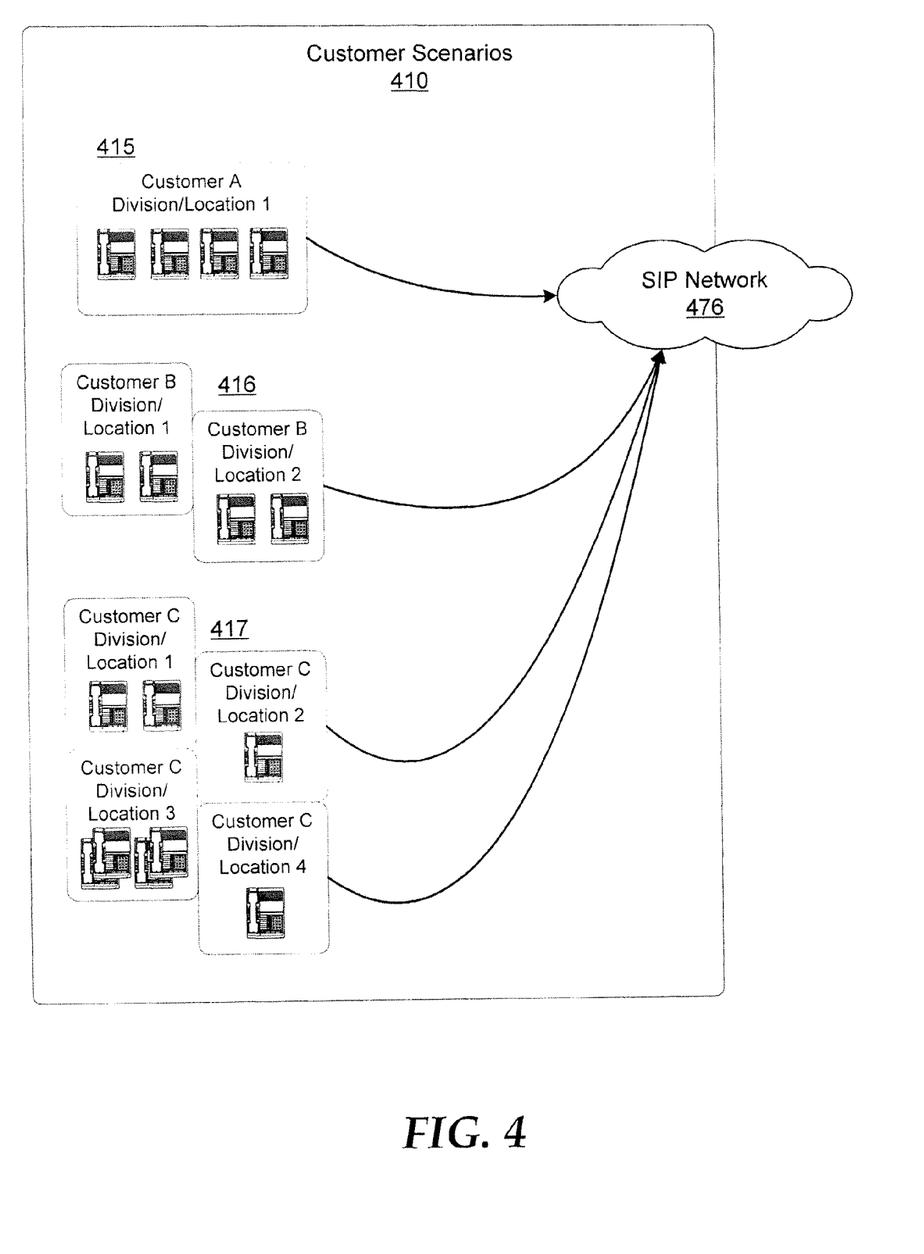
FIG. 4 illustrates example customer scenarios for the call routing management system of FIG. 1.

Referring now to FIG. 4, example customer scenarios 410 are illustrated. Customers of a call routing management center may include customer A representative of a plurality of customers calling from a single division and single location in scenario 415. In scenario 416, customer B may be representative of customers calling from two different locations of the same division of a client.

Scenario 417 illustrates example customer C calling from multiple locations (e.g. locations 1 through 4) of multiple divisions of the client. As illustrated in the different scenarios, customers may call from a variety of locations, from a variety of divisions. A call routing management center is typically arranged to be versatile enough to handle all calls. The calls may all go through SIP network 476.

In other embodiments, a call routing management center may be dedicated to one type of customer calling for a particular division of the client.

Figure 5:
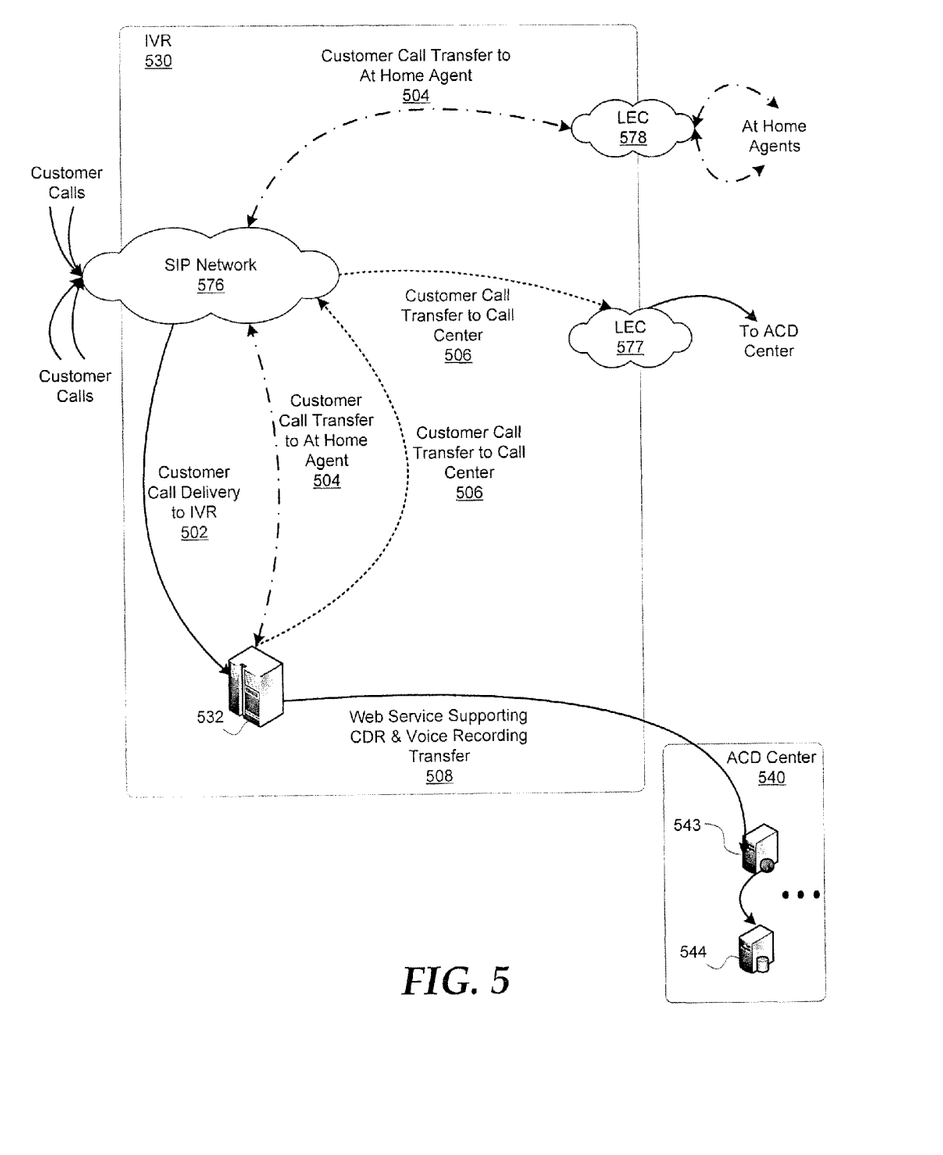
FIG. 5 illustrates example network routing and call delivery operations for a caller language based call routing management system with at home agent access and interactions of its components.

FIG. 5 illustrates example network routing and call delivery operations for a caller language based call routing management system with at home agent access and interactions of its components.

The main component of the call routing management system involved in network routing and call delivery operations is IVR subsystem 530. IVR subsystem 530 is configured to receive customer calls via SIP network 576. In one embodiment, the calls are processed by IVR server 532, which may determine caller language and route the calls based on caller language, resource availability, scheduling, and the like.

As part of the IVR subsystem 530, a Voice User Interface (VUI) may enable a user to securely dial an application, to which the at home agents can login/logout, activate/deactivate dialing and change password or DID number without a need for a computer or high speed internet/dedicated connectivity. A traditional PSTN phone may be sufficient to connect to the VUI via a toll free number.

According some embodiments, a SIP IVR subsystem may be employed as the core framework. The system may include built-in conferencing capabilities enabling an inbound call to be placed on hold while attempting a connection to either a specific language interpreter via a contact center or an at home agent.

In assigning and forwarding the customer calls to agents, the IVR subsystem 530 may:
  assign the calls based on business rules to a call center or an at home agent
  select based on business rules specific supported languages
  support one or many languages for the call center or the at home agent(s)
  implement a set of rules managing an at home agent's status for busy, Ring No Answer (RNA), or network error conditions
  implement a set of rules to support searching for an at home agent based on time or number of available agents
  implement a set of rules to support overflow calls to a language specialist
  report on different aspects of the at home agents (call length, connection quality, availability, etc.), and
  combine data for at home and call center agents within a same report Example IVR functions include receiving an 800 number and executing a client script from DNIS, dynamically providing a greeting, requesting for site# (DTMF), and requesting for language (for voice recognition). The IVR subsystem may also initiate an SIP, or SIP refer method as support by each Voice/IP carrier (e.g., Level 3, Global Crossings, etc.), to redirect the call to a call center or forward the call to an at home agent DID number based on the agent's language skills. In some embodiments, the IVR subsystem may overload custom ANI into language 800 call to identify client and site at Processing Center of ADC center 540 (example ANI format: 847-xxx-xxxx (847-site#-client#)).

To manage the at home agent access in caller language based call routing management, an example data structure may be utilized in a spreadsheet format with columns indicating supported languages, exclusion times, and the like.

Customer call delivery to IVR 502 represents the operation of the IVR server 532 receiving the customer call. Upon determining a forwarding direction for the call, IVR server 532 transfers the customer call to an at home agent (operation 504) or to the call center (operation 506). Both operations 504 and 506 may involve transfers from the SIP network 576 to a Local Exchange Carrier (LEC) 577 or 578 for the call center and at home agents, respectively.

In addition to transferring the customer calls to the call center or to at home agents, IVR server 532 may also facilitate services such as web service supporting, Call Detail Record (CDR) and Voice recording, and the like. Information associated with such services including the recording of the call itself may be transferred to ADC center 540 over any type of network including an LEC network, a LAN, a WAN, the Internet, wired or wireless network(s), and any combinations of those.

ADC center 540 is also partially illustrated in FIG. 5 with web server 543 and database server 544, which may provide the web support and CDR & Voice recording services.

Figure 6:
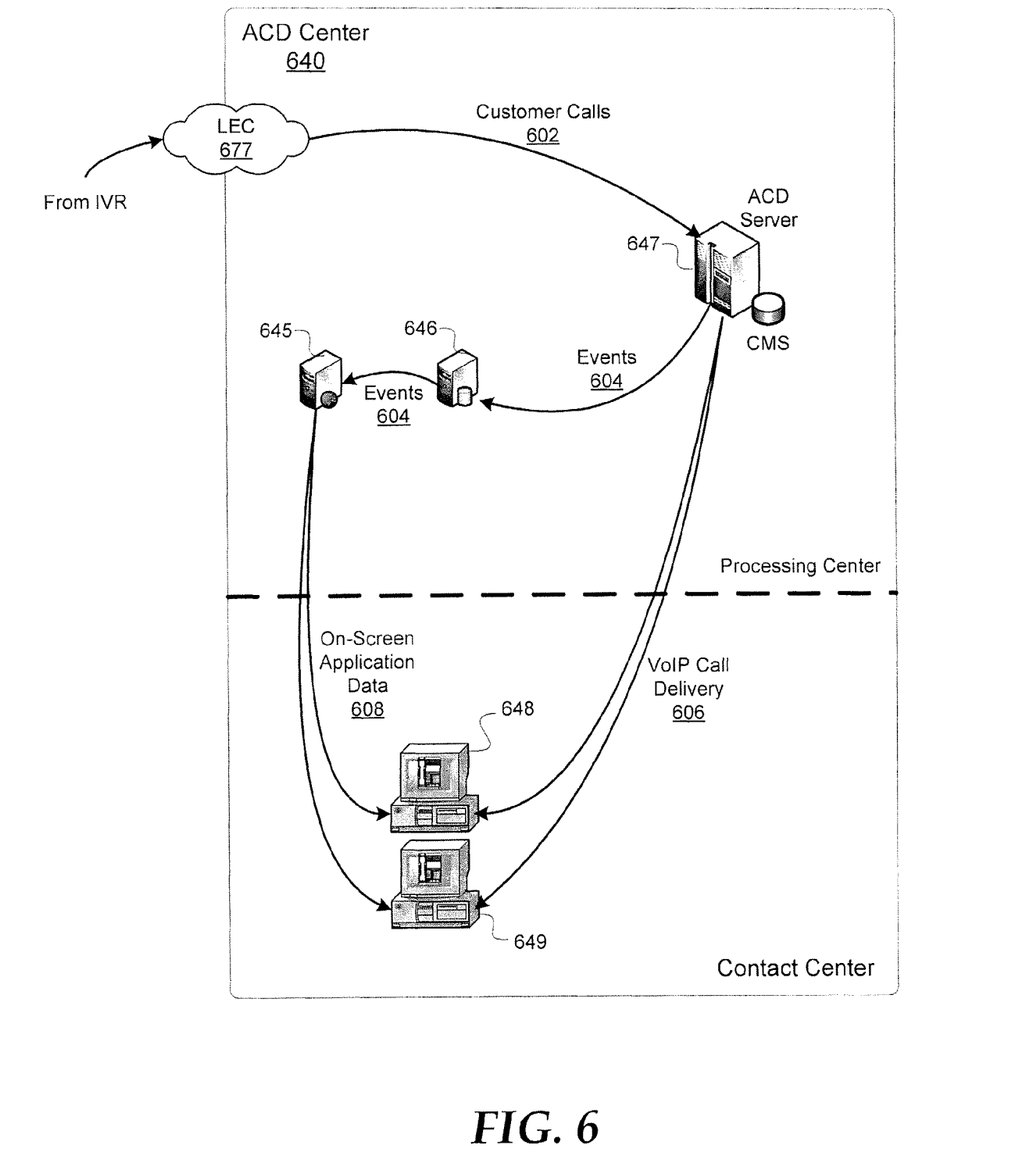
FIG. 6 illustrates example processing center and contact center blocks of an automated call distribution center.

FIG. 6 illustrates example processing center and contact center blocks of an automated call distribution center with at home agent access. ACD center 640 receives calls from IVR subsystem over LEC network 677. The customer calls are provided in operation 602 to ACD server 647. In one embodiment, ACD server 647 may also include configuration management (CMS) capabilities.

ACD server 647 may provide calls to agent computers at contact center via VoIP delivery (operation 606). Information associated with the calls may be delivered as events in operation 604 to database and Computer Telephony Integration (CTI) servers 646 and 645, respectively, which in turn provide on-screen application data to the agent computers in operation 608.

In another embodiment, ACD center 640 may include additional servers such as an applications server, a global workflow server, and further database servers. The global workflow server may provide workflow operation for the call center and/or clients served by the call center. Database servers may store information associated with the call for a number of purposes. In addition to storing statistical, financial, and other data associated with distributed calls for client billing, agent compensation, and scheduling, the database servers may be utilized for storing data associated with call history, client usage, customer usage, and the like, to be used by a business logic application for the call center or any of the clients.

A quality monitoring server may execute an application for monitoring agent-customer interactions. Calls may be recorded, analyzed, forwarded to other applications by the quality monitoring server. In another embodiment, the quality monitoring server may monitor quality of call distribution service, such as response time, number of steps it takes to assign an agent to a call, and the like, based on collected statistical data. A custom applications server may include any other application associated with the call center operations.

The custom applications server may also be utilized to execute client specific applications that provide services specified by particular clients.

Figure 7:
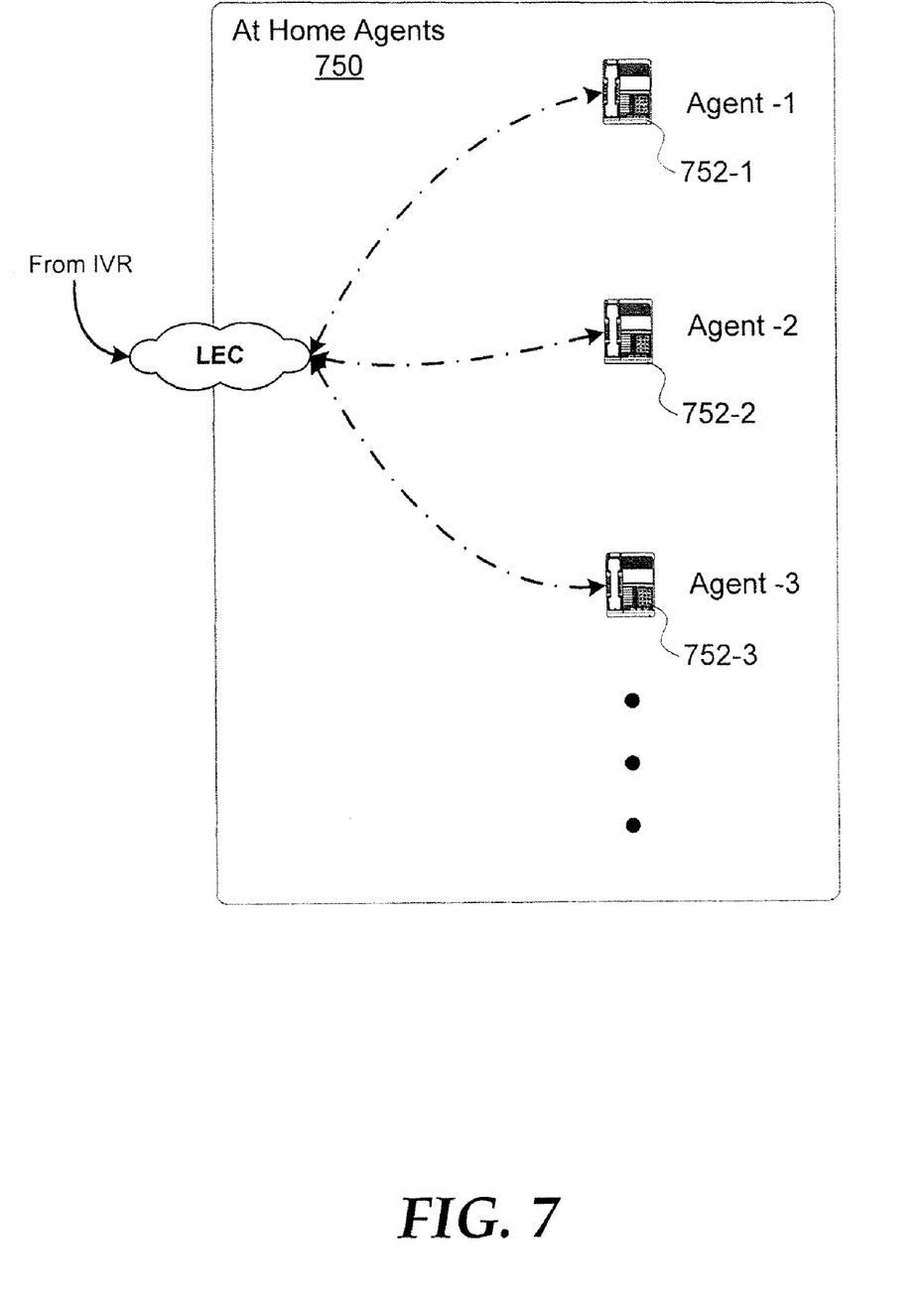
FIG. 7 illustrates an example at home agents block for a caller language based call routing management system with at home agent access and interactions of its components.

FIG. 7 illustrates example at home agents 750 for a caller language based call routing management system with at home agent access and interactions of its components. At home agents 1, 2, 3 (752-1, 752-2, 752-3), and so on, may receive forwarded customer calls from the IVR subsystem via LEC network.

Agents may perform functions such as dialing a Toll Free Number (TFN) of the call routing system from their home phone to login and activate/deactivate language skill dial-up to the same or another phone. Agents may also receive language calls based on their skills to their home phone.

Calls may be routed to the at home agents using a set of rules based on number of Ring No Answers (RNAs) and Busy signals. Example rules include:

RNA set to a preset number of rings.
RNA to at home agent results in searching for next available agent supporting language.
Busy signal to agent results in searching for next available agent supporting language.
If an agent has a preset number of RNAs, they are deactivated and have to call VUI application to activate.
Routing supports up to a preset number of agents then overflow to a language specialist.

The example rules and operations provided herein are intended for illustration purposes only and do not constitute a limitation on the embodiments. Other rules and operations for routing customer calls to at home agents based on caller language may be implemented without departing from a scope and spirit of the invention.

The computing devices and networks described herein are only examples of a suitable operating environment and are not intended to suggest any limitation as to the scope of use or functionality of the embodiments. Other well known computing systems, environments, and/or configurations that may be suitable for use with the embodiments may be implemented using the principles described herein without departing from a scope and spirit of the present invention.

Figure 8A:
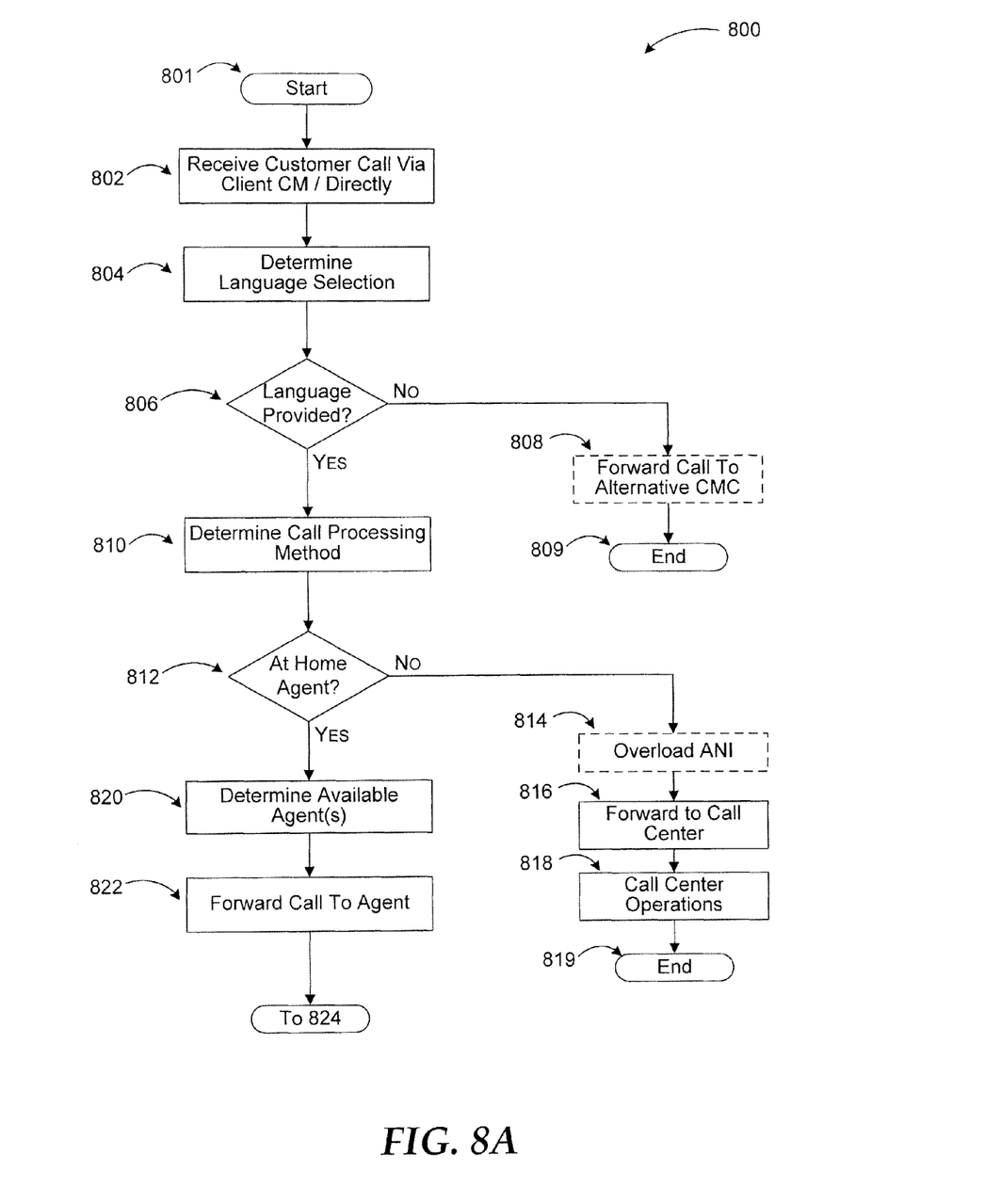
FIG. 8A is a flow diagram illustrating a process for a caller language based call routing management system with at home agent access in accordance with an embodiment.
Figure 8B:
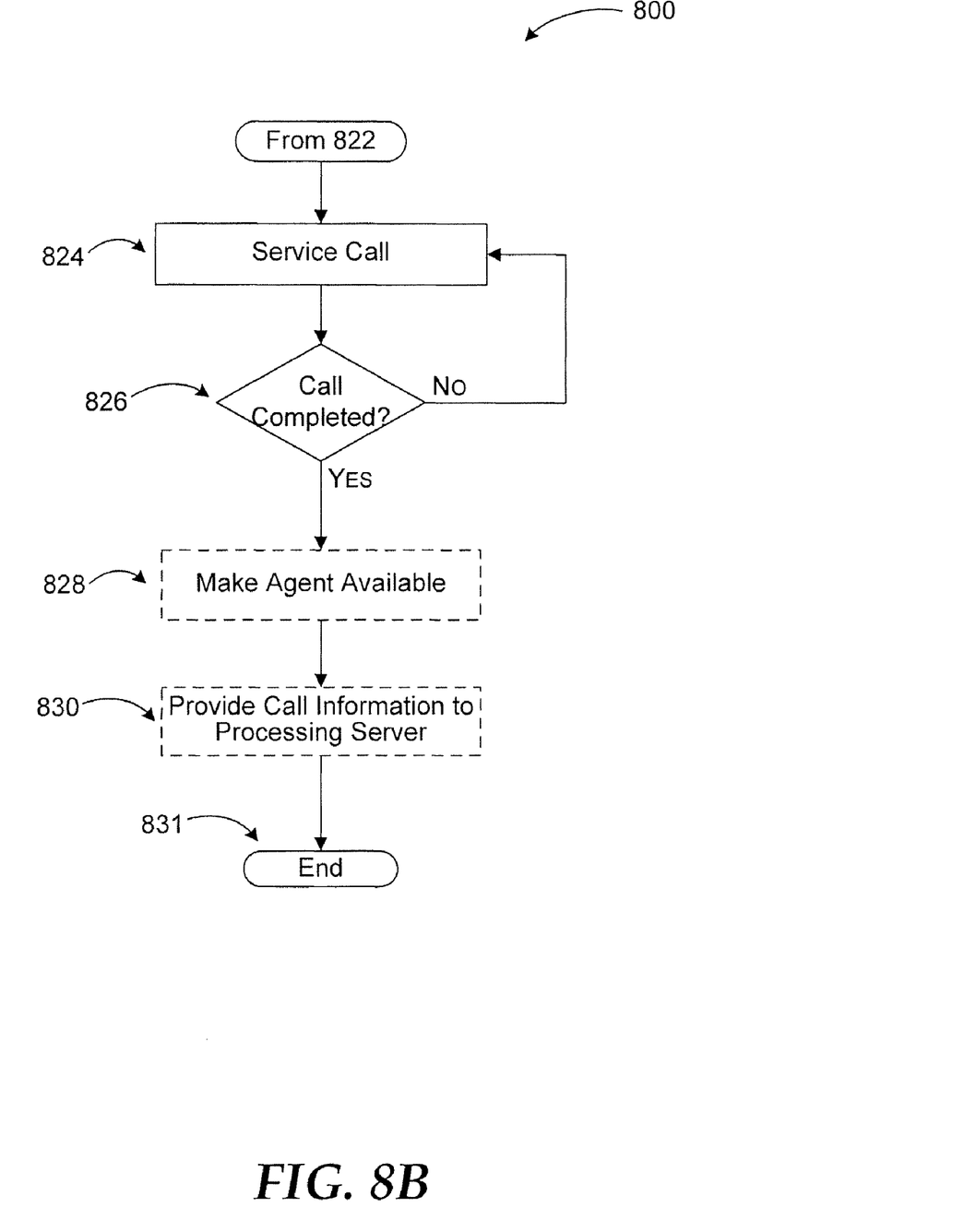
FIG. 8B is a flow diagram illustrating a process for forwarding a call to an agent as part of the process shown in FIG. 8A.

Referring now to FIG. 8A, caller language based call routing management process 800 embodies actions practiced by a system as described previously. In accordance with an exemplary embodiment, the operation flow of process 800 begins with a start operation 801 and concludes with one of terminate operations 809, 819, or 831 (as shown in FIG. 8B). The start operation 801 is initiated in response to a call being initiated by a customer. The call may be made to a client call management system and forwarded to the caller language based call routing management system or directly to the caller language based call routing management system by the customer. As such, with respect to the exemplary illustration provided herein, the call may involve a phone call, an electronic mail, an instant message, a video conferencing call, and the like. From the start operation 801, the operation flow passes to operation 802.

At operation 802, the customer initiated call is received at the call management center. The customer call may be received directly or via a client call management center. Processing advances from operation 802 to operation 804.

At operation 804, the preferred language of the customer is determined. The determination may be made by customer or client selection through DTMF key entry, or similar indication. In one embodiment, the language selection may be determined by detecting the customer's language at an IVR server. The IVR server may go through one or more prompts confirming the language of the customer. In another embodiment, the IVR server may also detect an accent of the customer, as explained previously. The operation flow passes to decision operation 806 from operation 804.

At decision operation 806, a determination is made whether the selected language is provided by the call management center (CMC). If the language is not one of the provided languages, the call may be provided to an alternative CMC within the call center or at another location in optional operation 808. Once the call is forwarded to the alternative CMC, that branch of the operation flow ends at terminate operation 809. On the other hand, if the language is among the languages provided by one of the agents associated with the CMC, the flow of operation moves to operation 810.

At operation 810, a call processing method is determined. Calls may be processed by call center agents or at home agents. Call center agents may be human agents or machine operations as described previously. In case of call center agents additional operations may be involved depending on a complexity of the call management system. In case of at home agents, similar complexity may also be involved. However, according to some embodiments, at home agents may simply service the calls from PSTN connections. The operation flow passes to decision operation 812 from operation 810.

At decision operation 812, a determination is made whether the call is to be processed by an at home agent. If the call is to be processed by at call center, processing moves to optional operation 814.

At optional operation 814, an origination identifier, such as an ANI number, may be overloaded with information identifying a client, a client project, a client subdivision, and the like associated with the call. The call is then forwarded with the overloaded call origination identifier to the CMC. One of a plurality of destination addresses (e.g. DNIS number) at the CMC is used based on the language selection. The destination address indicates to the CMC the language selection. The overloaded call origination identifier provides client specific information. Processing advances next to operation 816.

At operation 816, the ANI overloaded call is forwarded to the call center, where call center operations are performed as shown in subsequent operation 818. Call center operations may include servicing of the call by an at center agent, providing customer information to an agent terminal, monitoring of the call, collection of information associated with the call, and the like. Once the call is serviced, that branch of the operation flow ends at terminate operation 819.

On the other hand, the process flow advances to operation 820 from decision operation 812 if the call is to be processed by an at home agent. At operation 820, one or more available agents are determined. Agent availability may depend on at home agents that have reported their availability, at home agent language skills, time periods assigned to a particular client for servicing calls (schedule of available services), system capacity, network connection quality, and the like. Once available agents are determined, the operation flow passes from operation 820 to operation 822.

At operation 822, the call is forwarded to the assigned at home agent. The at home agent may use any one of the previously described communication methods including, but not limited to, PSTN connections, Internet telephony, cellular calls, and the like. The flow of operation passes from operation 822 to operation 824.

Operations 824 through 830 of process 800 are shown in FIG. 8B. At operation 824, the customer call is serviced by the at home agent. Once the at home agent is finished servicing the call, processing advances to decision operation 826.

At decision operation 826, a determination is made whether the call is completed. If the call is not yet completed, processing returns to operation 824. If the call is completed, flow of operation passes to optional operation 828.

At optional operation 828, the at home agent is made available to the system to take additional customer calls. In some embodiments, the system may determine availability of the at home agent based on completion of calls. In other embodiments, the at home agent may report his/her availability by calling into the system and making selections. Flow of operation passes from optional operation 828 to optional operation 830.

At optional operation 830, information associated with the completed customer call is provided to the call management system. Information associated with the call may be provided to a workflow managing application. The workflow managing application may be specific to the call center managing routing of calls to agents, scheduling of agent availability, sales scheduling, inventorying of service parts, and the like. In another embodiment, the information associated with the call may be provided to a database server. The database server may collect statistical and other data for financial analysis, reporting, agent compensation, and similar purposes. As described previously, other optional operations including client specified custom applications may also be executed in coordination with the servicing of the call by the assigned at home agent. Following optional operation 830, the operation flow ends at terminate operation 831.

The operations included in process 800 are for illustration purposes. Home agent access in call routing management based on caller language may be implemented by a similar process with fewer or additional steps, as well as in different order of operations.

Although the embodiments have been described in language specific to structural features, methodological acts, and computer readable media containing such acts, it is to be understood that the embodiments defined in the appended claims are not necessarily limited to the specific structure, acts, or media described. One skilled in the art will recognize other embodiments or improvements that are within the scope and spirit of the present invention.

What is claimed is:

1. A computer-implemented method to be executed at least in part in a call routing system for distributing customer initiated calls to one or more at home agents, comprising:
    determining a customer information from an ANI number associated with a customer initiated call;
    modifying the ANI number such that the customer information associated with a client is overloaded to the ANI number;
    detecting a language selection associated with the customer initiated call;
    assigning an at home agent to service the customer initiated call based on the language selection, a language skill of the at home agent, and a predetermined rule set, wherein the at home agent is enabled to access the call routing system over a telephony connection; and
    forwarding the customer initiated call to the assigned at home agent for servicing.

2. The computer-implemented method as defined in claim 1, wherein the customer initiated call includes at least one of: a Public Switched Telephone Network (PSTN) call, an Internet telephony call, a cellular call, and an electronic video conference call.

3. The computer-implemented method as defined in claim 1, wherein the language selection is detected by one of: a Dual Tone Multi-Frequency (DTMF) key entry and Interactive Voice Recognition (IVR).

4. The computer-implemented method as defined in claim 1, wherein the at home agent is further enabled to access the call routing system to report availability.

5. The computer-implemented method as defined in claim 1, wherein the predetermined rule set is based on a number of Ring No Answers (RNAs) and Busy signals.

6. The computer-implemented method as defined in claim 5, wherein the predetermined rule set includes at least one of: searching for another available agent in response to a preset number of RNAs, searching for another available agent in response to a busy signal, setting a status of an agent to unavailable in response to the preset number of RNAs, and forwarding the customer initiated call to a language specialist if no one of the one or more at home agents is available.

7. The computer-implemented method as defined in claim 1, further comprising:
    recording at least one of: a call duration, a connection quality, an at home agent availability, and a conversation between the customer and the assigned at home agent for call routing management purposes.

8. A system for distributing customer initiated calls to one or more at home agents based on a customer language preference, comprising:
    an IVR server configured to:
        overload a caller identification number such that a portion of the caller identification number corresponds to a client identifier and another portion of the client identification number corresponds to a client project;
        detect a language selection associated with a received customer call;
        assign an at home agent to service the received customer call based on the language selection, the at home agent's language skill, and a predetermined rule set, wherein the at home agent is enabled to access the call routing system over a telephony connection; and
        forward the received customer call to the assigned at home agent for servicing; and
    a call management server configured to:
        execute one or more applications associated with managing the call distribution.

9. The system as defined in claim 8, wherein the IVR server is further configured to assign the at home agent based on a language service schedule.

10. The system as defined in claim 8, wherein the IVR server is further configured to determine the at home agent's availability based on one of: a call-in report by the at home agent, a number of RNA's, and a Busy signal.

11. The system as defined in claim 8, wherein the call identification number includes one of: an Automated Number Identification (ANI) number, an International Mobile Subscriber Identity (IMSI) number, and an IP address.

12. The system as defined in claim 8, wherein the call management server is further configured to forward the customer call to a call center agent and execute at least one of: an application to provide customer information based on the overloaded caller identification number to the assigned agent, an application to monitor the call between the customer and the assigned agent for quality assurance, and an application to collect statistical information about the customer call.

13. The system as defined in claim 8, wherein at least one of: the IVR server and the call management server is configured to forward the call to one of: an alternative call management system and an overflow language specialist if the language selection is not serviced by any of the at home agents associated with the call distribution system.

14. A non-transitory computer readable medium having computer-executable instructions that, when executed by a processor, cause the processor to perform a method for distributing customer initiated calls to one or more at home agents based on a customer language preference, the computer process of:

determining a customer information from an ANI number associated with a customer initiated call;

modifying the ANI number such that the customer information associated with a client is overloaded to the ANI number;

detecting a language selection associated with the customer initiated call;

assigning an at home agent to service the customer initiated call based on at least one of: the language selection, a language skill of the at home agent, and a predetermined rule set, wherein the at home agent is enabled to access a call routing system over a telephony connection;

forwarding the customer initiated call to the assigned at home agent for servicing; and     executing one or more applications associated with managing the distribution of the customer initiated call.

15. The non-transitory computer readable medium as defined in claim 14, wherein the language selection is determined based on interactive voice recognition.

16. The non-transitory computer readable medium as defined in claim 15, wherein the computer process further comprises:

determining an accent of the customer; and assigning the at home agent based on the accent of the customer.

17. The non-transitory computer readable medium as defined in claim 15, wherein the computer process further comprises:

receiving the customer initiated call over a PSTN, wherein a call management center is arranged to process the customer initiated call on behalf of a client;

forwarding the customer initiated call to the call management center over a Session Initiation Protocol (SIP) network, wherein the forwarded customer initiated call includes the modified ANI number;

assigning a call center agent to the customer initiated call based on the modified ANI number and the language selection; and     forwarding the customer initiated call to the assigned agent.

18. The non-transitory computer readable medium as defined in claim 17, wherein modifying the ANI number includes overloading the ANI number with at least one of: a client identifier, a client subdivision identification, and a project identification.

19. The non-transitory computer readable medium as defined in claim 17, wherein the computer process further comprises:

retrieving the customer information that includes at least one of: a customer history record, a customer demographic record, and a customer geographic record from a database based on the ANI number; and     activating a user interface in an application such that the assigned agent receives the customer information associated with the customer initiated call.

20. The computer-implemented method as defined in claim 1, further comprising:

receiving the customer initiated call over a PSTN, wherein a call management center is arranged to process the customer initiated call on behalf of a client;

forwarding the customer initiated call to the call management center over a Session Initiation Protocol (SIP) network, wherein the forwarded customer initiated call includes the modified ANI number, wherein the modified ANI number is modified with at least one of: a client identifier, a client subdivision identification, and a project identification;

assigning a call center agent to the customer initiated call based on the modified ANI number and the language selection; and     forwarding the customer initiated call to the assigned agent.

\* \* \* \* \*